United States Patent
Su et al.

(10) Patent No.: US 11,258,541 B2
(45) Date of Patent: Feb. 22, 2022

(54) DATA TRANSMISSION METHOD AND DEVICE

(71) Applicant: HUAWEI TECHNOLOGIES CO., LTD., Shenzhen (CN)

(72) Inventors: Hongjia Su, Shanghai (CN); Jiyong Pang, Shanghai (CN); Zhengzheng Xiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 16/716,852

(22) Filed: Dec. 17, 2019

(65) Prior Publication Data
US 2020/0119849 A1  Apr. 16, 2020

Related U.S. Application Data

(63) Continuation of application No. PCT/CN2018/089303, filed on May 31, 2018.

(30) Foreign Application Priority Data

Jun. 23, 2017 (CN) .......... 201710487270.3

(51) Int. Cl.
*H04W 72/08* (2009.01)
*H04L 1/02* (2006.01)
(Continued)

(52) U.S. Cl.
CPC .............. *H04L 1/02* (2013.01); *H04B 7/026* (2013.01); *H04L 1/1812* (2013.01); *H04W 88/04* (2013.01); *H04W 92/18* (2013.01)

(58) Field of Classification Search
CPC . H04L 1/02; H04L 1/1812; H04L 2001/0093; H04L 2001/0097;
(Continued)

(56) References Cited

U.S. PATENT DOCUMENTS 10,778,387 B2 * 9/2020 Maaref ............... H04W 72/048
2013/0124937 A1  5/2013 Kim et al.
(Continued)

FOREIGN PATENT DOCUMENTS

CN  103988447 A  8/2014
CN  104871569 A  8/2015
(Continued)

OTHER PUBLICATIONS

Huawei et al.,"Sidelink Support and Enhancements for NR", 3GPP TSG RAN WG1 Meeting#85 R1-164379, Nanjing, China, May 23-27, 2016 (Year: 2016).*
(Continued)

*Primary Examiner* — Lan-Huong Truong
(74) *Attorney, Agent, or Firm* — Rimon PC

(57) ABSTRACT

The present disclosure discloses a data transmission method, device, and system. The method includes: receiving, by a cooperation device and a target device, to-be-transmitted data sent by a network side device. A first moment is defined as the moment when the target device feeds back, to the network side device, whether the to-be-transmitted data is correctly received is defined as a first moment. Before the first moment, the cooperation device is configured to send the to-be-transmitted data to the target device. And the target device is configured to receive, process and check the to-be-transmitted data sent by the cooperation device before the first moment.

18 Claims, 15 Drawing Sheets

(51) Int. Cl.
*H04B 7/026* (2017.01)
*H04L 1/18* (2006.01)
*H04W 88/04* (2009.01)
*H04W 92/18* (2009.01)

(58) Field of Classification Search
CPC ... H04L 1/1854; H04L 5/0055; H04L 5/0035; H04L 5/001; H04L 1/0007; H04L 1/0061; H04L 1/1607; H04B 7/026; H04W 88/04; H04W 92/18; H04W 72/1273; H04W 72/0446; H04W 16/14; H04W 72/121
See application file for complete search history.

(56) References Cited

U.S. PATENT DOCUMENTS

| | | | |
|---|---|---|---|
| 2014/0173372 | A1 | 6/2014 | Maaref et al. |
| 2016/0036565 | A1* | 2/2016 | Maaref ............... H04L 12/189 714/749 |
| 2016/0095128 | A1* | 3/2016 | Cao ..................... H04W 88/04 370/329 |
| 2016/0309466 | A1 | 10/2016 | Chen et al. |
| 2016/0373216 | A1 | 12/2016 | Maaref et al. |

FOREIGN PATENT DOCUMENTS

| | | |
|---|---|---|
| CN | 104993857 A | 10/2015 |
| CN | 105099629 A | 11/2015 |
| CN | 106533644 A | 3/2017 |
| KR | 20170020145 A | 2/2017 |
| WO | 2016050402 A1 | 4/2016 |
| WO | 2016076107 A1 | 5/2016 |
| WO | 2016164084 A1 | 10/2016 |
| WO | 2017028610 A1 | 2/2017 |
| WO | 2017052345 A1 | 3/2017 |

OTHER PUBLICATIONS

Huawei, et al., "Support for UE Cooperation in NR," 3GPP TSG RAN WG1 Meeting, #85 R1-164379, Nanjing, China, May 23, 2016, Agenda Item: 7.1.7, pp. 1-7.

Catt: "Resource Allocation for UE-to-Network relay operation",3GPP Draft; R1-152574,May 24, 2015 (May 24, 2015), XP050971457,total 4 pages.

Huawei et al.,"Sidelink Support and Enhancements for NR",3GPP TSG RAN WG1 Meeting #86 R1-167207, Gothenburg, Sweden, Aug. 22, 2016,Total 7 Pages.

* cited by examiner

CONT. FROM
FIG. 7A
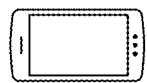 CUE 1   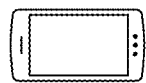 CUE 2   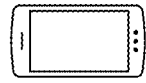 CUE 3
Unlicensed frequency band
($1^{st}$ to 10 MHz)
Unlicensed frequency band
($2^{nd}$ to 10 MHz)
Unlicensed frequency band
($3^{rd}$ to 10 MHz)
TO FIG.7D
FIG. 7C CONT. FROM
FIG. 7B
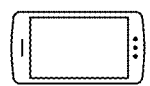
CUE 3
CONT. FROM
FIG. 7C
Unlicensed frequency band
($4^{th}$ to 10 MHz)
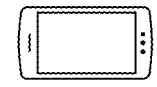
TUE
FIG. 7D

DATA TRANSMISSION METHOD AND DEVICE

CROSS-REFERENCE TO RELATED APPLICATIONS

This application is a continuation of International Application No. PCT/CN2018/089303, filed on May 31, 2018, which claims priority to Chinese Patent Application No. 201710487270.3, filed on Jun. 23, 2017. The disclosures of the aforementioned applications are hereby incorporated by reference in their entireties.

TECHNICAL FIELD

The present disclosure relates to the communications technology field, and more specifically, to a data transmission method, a communications device, and a data transmission system.

BACKGROUND

In a wireless communications system, when user equipment is located on an edge of a network coverage area, or when interference of an ambient environment of the user equipment to a network service is relatively great, network service quality of the user equipment is usually relatively low. Therefore, a base station is required to send data to the user equipment by performing a plurality of retransmissions. Sometimes the base station is unable to send the data to the user equipment even after performing a plurality of retransmissions.

SUMMARY

In view of this, this application provides a data transmission method, a communications device, and a data transmission system, to increase the success probability of data transmission and reduce the need of retransmission by a network side device to user equipment.

According to a first aspect, an embodiment of the present disclosure provides a data transmission method. The method includes: receiving, by a cooperation device, to-be-transmitted data sent by a network side device to a cooperation group, where the cooperation group includes the cooperation device and a target device; and sending, by the cooperation device, the to-be-transmitted data to the target device before a first moment, where a moment at which the target device feeds back, to the network side device, whether the to-be-transmitted data is correctly received is defined as the first moment. A moment at which the cooperation device sends the to-be-transmitted data to the target device is defined as a second moment. Duration between the second moment and the first moment is greater than or equal to duration required by the target device to receive, process, and check the to-be-transmitted data sent by the cooperation device.

In the method provided in the first aspect, even if the target device cannot correctly receive the to-be-transmitted data sent by the network side device, if the target device can correctly receive the to-be-transmitted data forwarded by the cooperation device, the target device does not need to request the network side device to retransmit the to-be-transmitted data, which can effectively improve a success probability that the target device receives data, and reduce a probability that the network side device performs retransmission to the target device.

According to the first aspect, in a first possible implementation of the data transmission method, the cooperation device sends the to-be-transmitted data to the target device by using a sidelink between the cooperation device and the target device. A frequency band used for transmission on the sidelink is a licensed frequency band or an unlicensed frequency band. The unlicensed frequency band has low use costs, does not cause interference to communication between the network side device and the target device or the cooperation device, and does not occupy a valuable licensed frequency band resource.

According to the first aspect, in a second possible implementation of the data transmission method, when the unlicensed frequency band is used for transmission on the sidelink, a channel used for transmission on the sidelink includes one or more candidate sidelink channels. The method further includes: receiving, by the cooperation device in a common sidelink subframe, information used to indicate whether the target device correctly receives the to-be-transmitted data, where the common sidelink subframe is a subframe at a preset location that is on the sidelink channel and that is agreed on between the target device and the cooperation device. The method further includes: if the cooperation device receives, before completing sending of the to-be-transmitted data to the target device, information used to indicate that the target device correctly receives the to-be-transmitted data, abandoning, by the cooperation device, sending the to-be-transmitted data to the target device. Therefore, the cooperation device can timely learn by using the common sidelink subframe, an ACK fed back by the target device, and does not need to send the to-be-transmitted data to the target device, thereby effectively reducing usage of a spectrum resource.

According to the first aspect or the first possible implementation of the first aspect, in a third possible implementation of the data transmission method, the method further includes: sensing, by the cooperation device, the sidelink channel, and when sensing an available sidelink channel, determining whether the duration between a current moment and a moment corresponding to a next common sidelink subframe is greater than or equal to the duration required for sending the to-be-transmitted data. When the duration between the current moment and the moment corresponding to the next common sidelink subframe is greater than or equal to the duration required for sending the to-be-transmitted data, the step of sending, by the cooperation device, the to-be-transmitted data to the target device is performed. When the duration between the current moment and the moment corresponding to the next common sidelink subframe is less than the duration required for sending the to-be-transmitted data, before the next common sidelink subframe, the cooperation device abandons sending the to-be-transmitted data to the target device, and after the next common sidelink subframe, performs the step of sending, by the cooperation device, the to-be-transmitted data to the target device.

According to the first aspect or any one of the implementations of the first aspect, in a fourth possible implementation of the data transmission method, the cooperation device receives cooperation control signaling sent by the network side device or the target device, where the cooperation control signaling indicates a cooperation policy. Alternatively, the cooperation device determines the cooperation policy based on a rule agreed with the target device. The cooperation policy includes a cooperation mode type and parameters specifically used in the cooperation mode.

According to a second aspect, a data transmission method is provided. The method includes: receiving, by a target device, to-be-transmitted data sent by a network side device to a cooperation group, where the cooperation group includes a cooperation device and the target device; receiving, processing, and checking, by the target device before a first moment, the to-be-transmitted data sent by the cooperation device. A moment at which the target device feeds back, to the network side device, whether the to-be-transmitted data is correctly received is defined as the first moment.

In the method provided in the second aspect, even if the target device cannot correctly receive the to-be-transmitted data sent by the network side device, if the target device can correctly receive the to-be-transmitted data forwarded by the cooperation device, the target device does not need to request the network side device to retransmit the to-be-transmitted data, which can effectively improve a success probability that the target device receives data, and reduce a probability that the network side device performs retransmission to the target device.

According to the second aspect, in a first possible implementation of the data transmission method, a moment at which the target device receives the to-be-transmitted data sent by the network side device is defined as a third moment. The target device has at least one subframe that is between the third moment and the first moment and that is not used to process the to-be-transmitted data sent by the network side device. When the cooperation mode is used, a TTI used for transmission on a sidelink between the cooperation device and the target device may not be changed, so that cooperation transmission may be implemented without increasing processing complexity.

According to the second aspect or the first possible implementation of the second aspect, in a second possible implementation of the data transmission method, the target device receives, by using a sidelink between the target device and the cooperation device, the to-be-transmitted data sent by the cooperation device. A frequency band used for transmission on the sidelink is a licensed frequency band or an unlicensed frequency band. The unlicensed frequency band has low use costs, does not cause interference to communication between the network side device and the target device or the cooperation device, and does not occupy a valuable licensed frequency band resource.

According to the second aspect or the first possible implementation of the second aspect, in a third possible implementation of the data transmission method, when the unlicensed frequency band is used for transmission on the sidelink, a channel used for transmission on the sidelink includes one or more candidate sidelink channels. The method further includes: sending, by the target device in a common sidelink subframe, information used to indicate whether the to-be-transmitted data is correctly received. The common sidelink subframe is a subframe at a preset location that is on the sidelink channel and that is agreed on between the target device and the cooperation device. Therefore, the cooperation device can timely learn by using the common sidelink subframe, an ACK fed back by the target device, and does not need to send the to-be-transmitted data to the target device, thereby effectively reducing usage of a spectrum resource. The method further includes: separately sensing, by the target device on each candidate sidelink channel, the to-be-transmitted data sent by the cooperation device.

According to the second aspect or any one of the implementations of the second aspect, in a fourth possible implementation of the data transmission method, the target device receives cooperation control signaling sent by the network side device. The cooperation control signaling indicates a cooperation policy. Alternatively, the target device determines the cooperation policy based on a rule agreed with the cooperation device.

According to any one of the first aspect, the second aspect, or the foregoing implementations, in another possible implementation, a transmission time interval TTI used for transmission between the cooperation device and the target device is less than a TTI used for transmission between the target device and the network side device. When the cooperation mode is used, cooperation transmission can be quickly implemented without changing HARQ feedback duration and HARQ process of the target device for the to-be-transmitted data sent by the network side device, and without increasing latency. A TTI 1 may be enabled to be less than a TTI 2 in the following manners.

Manner 1: A quantity of symbols included in a subframe corresponding to the TTI 1 is less than a quantity of symbols included in a subframe corresponding to the TTI 2.

A smaller quantity of symbols in a subframe indicates a smaller subframe length. Therefore, the corresponding TTI is smaller.

Manner 2: A length of the symbols included in the subframe corresponding to the TTI 1 is less than a length of the symbols included in the subframe corresponding to the TTI 2.

According to a third aspect, a communications device is provided. The communications device includes a processor and a transceiver. The transceiver is configured to receive to-be-transmitted data sent by a network side device to a cooperation group, where the cooperation group includes the communications device and a target device. The processor is configured to control the transceiver to send the to-be-transmitted data to the target device before a first moment. A moment at which the target device feeds back, to the network side device, whether the to-be-transmitted data is correctly received is defined as the first moment. A moment at which the transceiver sends the to-be-transmitted data to the target device is defined as a second moment. The duration between the second moment and the first moment is greater than or equal to the duration required by the target device to receive, process, and check the to-be-transmitted data sent by the transceiver.

In the communications device provided in the third aspect, even if the target device cannot correctly receive the to-be-transmitted data sent by the network side device, if the target device can correctly receive the to-be-transmitted data forwarded by the communications device, the target device does not need to request the network side device to retransmit the to-be-transmitted data, which can effectively improve a success probability that the target device receives data, and reduce a probability that the network side device performs retransmission to the target device.

According to a fourth aspect, a communications device is provided. The communications device includes a processor and a transceiver. The transceiver is configured to receive to-be-transmitted data sent by a network side device to a cooperation group, where the cooperation group includes a cooperation device and the communications device. The transceiver is further configured to receive the to-be-transmitted data sent by the cooperation device. The processor is configured to process and check, before a first moment, the to-be-transmitted data sent by the cooperation device. A moment at which the communications device feeds back, to the network side device, whether the to-be-transmitted data is correctly received is defined as the first moment.

In the communications device provided in the fourth aspect, even if the communications device cannot correctly receive the to-be-transmitted data sent by the network side device, if the communications device can correctly receive the to-be-transmitted data forwarded by the cooperation device, the communications device does not need to request the network side device to retransmit the to-be-transmitted data, which can effectively improve a success probability that the communications device receives data, and reduce a probability that the network side device performs retransmission to the communications device.

According to a fifth aspect, a communications system is provided. The system includes the communications device according to the third aspect and the communications device according to the fourth aspect.

According to still another aspect of this application, a computer-readable storage medium is provided. The computer-readable storage medium may be transitory or non-transitory, and stores a computer software instruction used by the communications device according to the third aspect. When the computer software instruction is run on a computer, the computer performs the methods according to the foregoing aspects.

According to still another aspect of this application, a computer-readable storage medium is provided. The computer-readable storage medium may be transitory or non-transitory, and stores a computer software instruction used by the communications device according to the fourth aspect. When the computer software instruction is run on a computer, the computer performs the methods according to the foregoing aspects.

BRIEF DESCRIPTION OF DRAWINGS

FIG. 7A, FIG. 7B, FIG. 7C, and FIG. 7D are example schematic diagrams of user cooperation according to an embodiment of the present disclosure;

DESCRIPTION OF EMBODIMENTS

The following describes the technical solutions in the embodiments of the present disclosure with reference to the accompanying drawings in the embodiments of the present disclosure.

Figure 1:
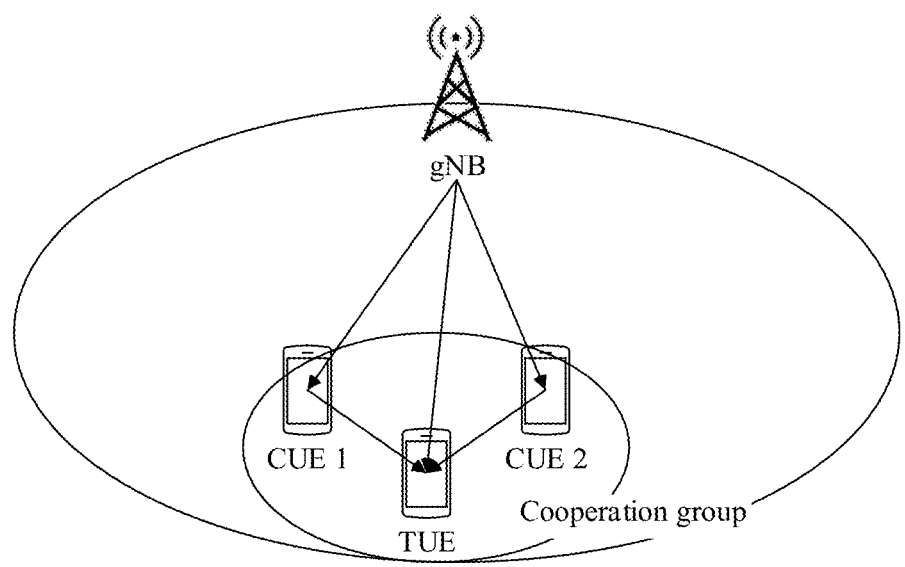
FIG. 1 is an example schematic diagram of a communications system according to an embodiment of the present disclosure.

The technical solutions in the embodiments of the present disclosure that are described below are applicable to a communications system. The communications system may include a network side device and at least two terminal devices that communicate with the network side device. Two or more terminal devices may also communicate with each other. FIG. 1 shows an example of the communications system. The communications system shown in FIG. 1 includes one network side device (a gNB shown in FIG. 1) and a plurality of terminal devices (CUE 1, CUE 2, and TUE shown in FIG. 1) that communicate with the network side device.

The network side device may be a device that can communicate with user equipment. The network side device may be, for example, a base station (a macro base station, a small cell/a micro base station, a home base station, or the like), a relay station, or an access point. The base station may be, for example, a base transceiver station (BTS) in a global system for mobile communications (GSM) or a code division multiple access (CDMA) network, or may be an NB (NodeB) in wideband code division multiple access (WCDMA) network, or may be an eNB or an eNodeB (Evolved NodeB) in long term evolution (LTE) network, or may be a gNB in a future 5G network or a new radio (NR) network. The network side device may alternatively be, for example, a transmission reception point (TRP) in a network. The network side device may alternatively be, for example, a radio controller in a cloud radio access network (CRAN) scenario. The network side device may alternatively be, for example, an access point (AP) in WiFi. The network side device may alternatively be, for example, a wearable device or a vehicle-mounted device.

The terminal device may be user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. An access terminal may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in a future 5G network, a terminal device in a future evolved PLMN network, or the like.

When a specific terminal device is located on an edge of a network coverage area or when interference of an ambient environment on a network service is relatively great, network service quality of the terminal device is relatively low. For example, a target device TUE in FIG. 1 is located on an edge of a network coverage area. The network device gNB is very likely to fail to send downlink data to the TUE, and therefore a retransmission is required. As shown in FIG. 1, because cooperation devices CUE (CUE 1 and CUE 2 shown in FIG. 1) are closer to the gNB, and network service quality between the CUE and the gNB is relatively good, the CUE may cooperate with the gNB to send data to the TUE. In this case, the technical solutions provided in the embodiments of the present disclosure are as follows: A target device and at least one cooperation device are configured to constitute a cooperation group. When the network side device gNB needs to send data to the target device, the network side device sends the data to the cooperation group, and both the cooperation device and the target device in the cooperation group can receive the data. Because the target device is located on an edge of a network area, the target device may fail to receive the data. However, network service quality of the cooperation device is relatively good. Therefore, the cooperation device is very likely to correctly receive the data. It is assumed that a moment at which the target device feeds back, to the network side device, whether the data (ACK/NACK) is correctly received is defined as a first moment. The cooperation device may forward the received data to the target device before the first moment by using a sidelink, and the target device may receive, process, and check, before the first moment, the data sent by the cooperation device. Therefore, even if the target device cannot correctly receive the data sent by the network side device, if the target device can correctly receive, before the first moment, the data forwarded by the cooperation device, the target device does not need to feed back a NACK at the first moment, but only needs to feedback an ACK. In this case, the network side device does not need to retransmit the data. The technical solutions provided in the embodiments of the present disclosure may help the network side device send data to the target device, increase a success probability of data transmission, and reduce a probability that the network side device performs retransmission to user equipment. It may be understood that the cooperation device and the target device may be the terminal devices described above. In the embodiments of the present disclosure, to help distinguish between the terminal devices, the terminal devices may be separately referred to as the cooperation device and the target device. It may be understood that this is merely an example description.

Figure 2:
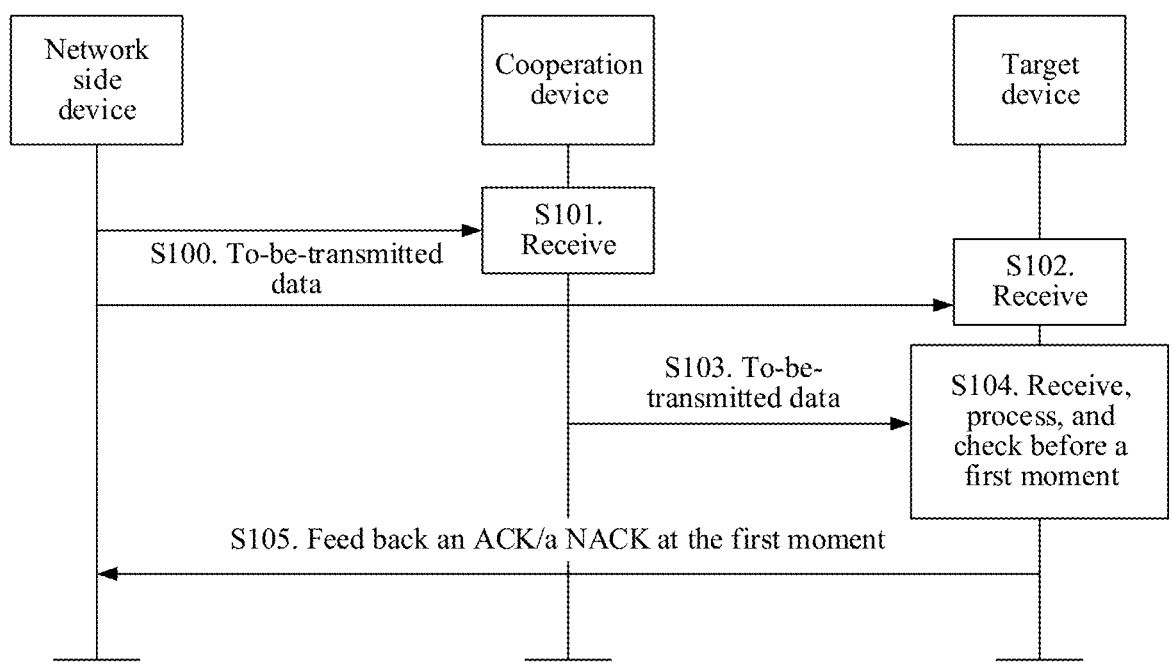
FIG. 2 is an example flowchart of a data transmission method according to an embodiment of the present disclosure.

An embodiment of the present disclosure provides a data transmission method. In the embodiments of the present disclosure, an example in which a network side device needs to send data to a target device and a cooperation device helps the network side device send data to the target device is used for description. As shown in FIG. 2, in a first embodiment of the data transmission method, the method includes the following steps.

S100. The network side device sends to-be-transmitted data to a cooperation group. The cooperation group includes a cooperation device and a target device, and there is at least one cooperation device. For example, as shown in FIG. 1, there are two cooperation devices.

In an embodiment, the cooperation group may be configured by the network side device. The network side device may determine the cooperation device and a cooperation group identifier for the target device based on a communication status or a request of the target device. The network side device sends the cooperation group identifier to the target device and the cooperation device. The network side device further sends a target device identifier to the cooperation device.

In another embodiment, the target device may initiate establishment of the cooperation group. The target device may first initiate a request to the network side device, and the network side device delivers the cooperation group identifier to the target device. The target device may notify the cooperation device of the cooperation group identifier by using a sidelink established between the target device and the cooperation device. The sidelink may also be referred to as a D2D (device-to-device) link, an M2M (Machine to Machine) link, a terminal straight-through link, an end-to-end link, a sidelink, or the like.

The sidelink between the target device and the cooperation device may be pre-established. Alternatively, the target device and the cooperation device negotiate with each other (for example, D2D discovery and D2D synchronization) to establish the sidelink. For example, if the cooperation device receives a synchronization signal of the target device, synchronizes with the target device, and receives information sent by the target device, it may be considered that the sidelink is established between the target device and the cooperation device. Alternatively, by using the D2D discovery, the target device discovers the cooperation device, and the cooperation device agrees to be discovered. In this case, it may be considered that the sidelink is established between the target device and the cooperation device. Alternatively, the network side device instructs to establish the sidelink between the target device and the cooperation device. If the network side device authorizes the target device to communicate with the cooperation device on the sidelink, it may be considered that the sidelink is established between the target device and the cooperation device.

In an embodiment, the cooperation group identifier is different from the target device identifier and the cooperation device identifier. In another embodiment, the network side device may further directly configure the target device identifier as the cooperation group identifier. The cooperation group identifier is unique to at least one cell.

S101. The cooperation device receives the to-be-transmitted data sent by the network side device to the cooperation group.

S102. The target device receives the to-be-transmitted data sent by the network side device to the cooperation group.

When the network side device needs to send the to-be-transmitted data to the target device, the network side device multicasts the to-be-transmitted data by using the cooperation group identifier. The target device and each cooperation device parse the to-be-transmitted data by using the cooperation group identifier.

It may be understood that there is no required sequence of performing steps S101 and S102.

S103. The cooperation device sends the to-be-transmitted data to the target device before a first moment.

A moment at which the target device feeds back, to the network side device, whether the to-be-transmitted data (ACK/NACK) is correctly received is defined as the first moment. A moment at which the cooperation device sends the to-be-transmitted data to the target device is defined as a second moment. Duration between the second moment and the first moment is or should be greater than or equal to duration required by the target device to receive, process, and check the to-be-transmitted data sent by the cooperation device.

The receiving, processing, and checking may be understood as performing receiving, parsing, decoding, checking, and the like on the to-be-transmitted data. After the target device receives, processes, and checks the to-be-transmitted data sent by the cooperation device, the target device may determine whether the to-be-transmitted data sent by the cooperation device is successfully received.

S104. The target device receives, processes, and checks, before the first moment, the to-be-transmitted data sent by the cooperation device.

Specifically, step S103 includes: The cooperation device sends the to-be-transmitted data to the target device by using the sidelink between the cooperation device and the target device. Step S104 includes: The target device receives, processes, and checks, before the first moment by using the sidelink, the to-be-transmitted data sent by the cooperation device. Sidelink communication is not constrained by network coverage, and may work in a plurality of scenarios with network coverage, with no network coverage, with partial network coverage, and the like.

In an existing LTE system, considering a processing delay, a transmission delay, and the like of data decoding, a terminal usually requires three subframes to complete receiving, processing, checking, and the like of downlink data. For the downlink data received by the terminal in an $N^{th}$ subframe, the terminal usually gives an uplink feedback in an $(N+4)^{th}$ subframe, to notify the network side device whether the downlink data is correctly received. If the downlink data is correctly received, the terminal feeds back an ACK. If the downlink data is incorrectly received, the terminal feeds back a NACK to trigger a base station to perform retransmission. Therefore, in the existing LTE system, if the network side device sends the to-be-transmitted data to the cooperation group in an $N^{th}$ subframe, the cooperation device and the target device receive the to-be-transmitted data in the $N^{th}$ subframe, and the cooperation device and the target device require three subframes to complete receiving, processing, checking, and the like of the to-be-transmitted data. The target device needs to feedback, to the network side device in an $(N+4)^{th}$ subframe, whether the to-be-transmitted data is correctly received. The cooperation device does not have enough time to forward the to-be-transmitted data to the target device before the $(N+4)^{th}$ subframe. Alternatively, even if the cooperation device can forward the to-be-transmitted data to the target device before the $(N+4)^{th}$ subframe, the target device still does not have enough time to complete receiving, processing, checking, and the like of the to-be-transmitted data forwarded by the cooperation device. Therefore, in the prior art, the cooperation device cannot help the network side device improve a success probability of initial data transmission. In actual application, a probability that the target device feeds back a NACK to the network side device for the first time is approximately 10%. A probability that the target device feeds back a NACK to the network side device for the second time is approximately 1‰. Therefore, it is necessary to improve the success probability of initial transmission performed by the network side device to the target device, to obtain a greater gain.

In this embodiment of the present disclosure, the following implementations may be used, so that the target device can have enough time (that is, before the first moment) to receive, process, and check the to-be-transmitted data forwarded by the cooperation device.

Implementation 1: In a faster cooperation mode (FCM), a transmission time interval TTI used for transmission between the cooperation device and the target device is less than a TTI used for transmission between the target device and the network side device, in other words, the TTI used on the sidelink is less than the TTI used for the transmission between the target device and the network side device. A TTI is a time length required for independent decoding and transmission in wireless communication. In the faster cooperation mode, cooperation transmission can be quickly implemented without changing HARQ feedback duration and a HARQ process of the target device for the to-be-transmitted data sent by the network side device and without increasing a delay.

Figure 3:
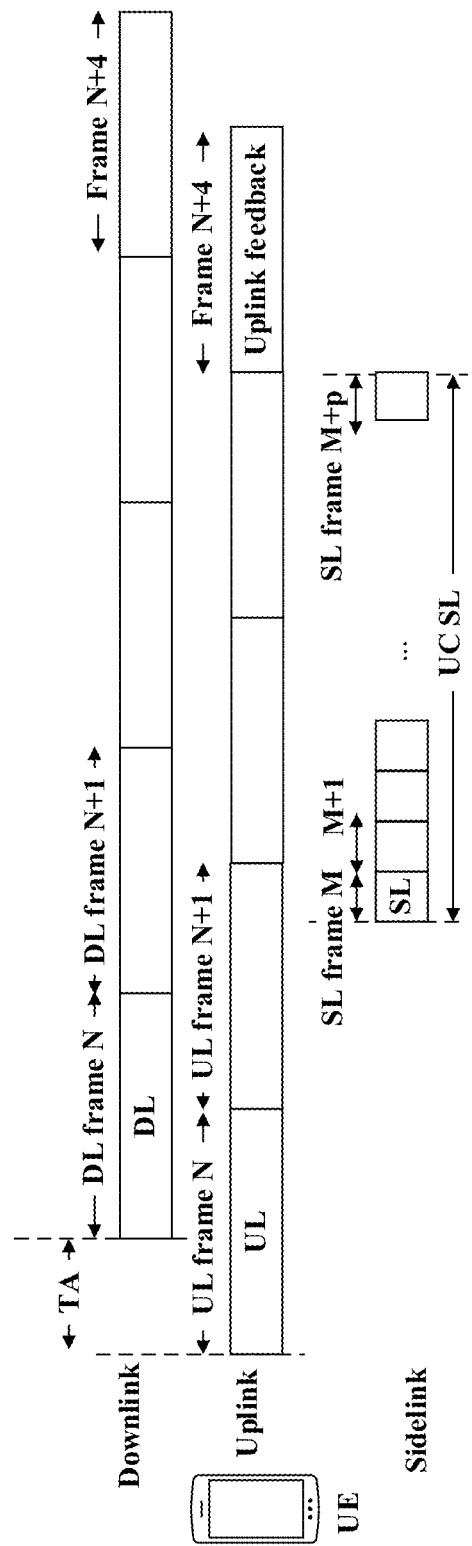
FIG. 3 is an example schematic diagram of a faster cooperation mode according to an embodiment of the present disclosure.

In this implementation, the transmission time interval used on the sidelink is defined as a TTI 1, and the transmission time interval used for the transmission between the target device and the network side device is defined as a TTI 2. The TTI 1 is or should be less than the TTI 2. There may be an algebraic relationship between the TTI 1 and the TTI 2, for example, TTI 2=k·TTI 1, and k>1. A specific value of k may be set based on an actual requirement, provided that the target device can receive, process, and check, before the first moment, the to-be-transmitted data sent by the cooperation device. As shown in FIG. 3, the TTI used on the sidelink is a TTI (namely, the TTI 1) corresponding to an SL frame in FIG. 3, and the TTI used for the transmission between the target device and the network side device is a TTI (namely, the TTI 2) corresponding to a DL frame and a UL frame in FIG. 3. The TTI 1 is less than the TTI 2. Therefore, in the duration between the moment at which the network side device sends the to-be-transmitted data and the first moment, a quantity of TTIs 1 is greater than a quantity of TTIs 2.

In this embodiment of the present disclosure, a quantity of subframes required by the target device and the cooperation device to receive, process, and check the to-be-transmitted data may be, for example, 1, 2, or 3. A specific quantity of required subframes may be set based on an actual requirement, and is not limited herein. Regardless of the quantity of subframes required by the target device and the cooperation device to receive, process, and check the to-be-transmitted data, the quantity of TTIs 1 in the duration between the moment at which the network side device sends the to-be-transmitted data and the first moment only needs to be enough for the cooperation device to receive and forward the to-be-transmitted data, and enough for the target device to receive, process, and check the to-be-transmitted data forwarded by the cooperation device.

The TTI 1 may be enabled to be less than the TTI 2 in the following manners.

Manner 1: A quantity of symbols included in a subframe corresponding to the TTI 1 is less than a quantity of symbols included in a subframe corresponding to the TTI 2.

A smaller quantity of symbols in a subframe indicates a shorter subframe length and a shorter corresponding TTI.

Manner 2: A length of the symbol included in the subframe corresponding to the TTI 1 is less than a length of the symbol included in the subframe corresponding to the TTI 2.

A length of a symbol depends on a size of a subcarrier spacing, and a greater subcarrier spacing indicates a shorter symbol length. Therefore, a subcarrier spacing used on the sidelink is greater than a subcarrier spacing used for the transmission between the target device and the network side device.

As shown in FIG. 3, it is assumed that the network side device sends to-be-transmitted data to the cooperation group in an $N^{th}$ subframe (namely, a DL frame N in FIG. 3), and the cooperation device and the target device receive the to-be-transmitted data in the $N^{th}$ subframe. After making preparations to parse and send the received to-be-transmitted data, the cooperation device forwards the to-be-transmitted data to the target device in an $M^{th}$ sidelink subframe (namely, an SL frame M in FIG. 3). It is assumed that the target device requires three sidelink subframes to complete receiving, processing, checking, and the like of the to-be-transmitted data, and it is assumed that the target device feeds back, to the network side device in a UL frame N+4, whether the to-be-transmitted data is correctly received. Therefore, it only needs to be ensured that an $(M+3)^{th}$ sidelink subframe is before the UL frame N+4.

The manner 1 and the manner 2 may be used in combination.

Implementation 2: In a longer cooperation mode (LCM), a moment at which the target device receives the to-be-transmitted data sent by the network side device is defined as a third moment. Duration between the third moment and the first moment is greater than duration required by the target device to receive, process, and check the to-betransmitted data sent by the network side device. The target device has at least one subframe that is between the third moment and the first moment and that is not used to process the to-be-transmitted data sent by the network side device, so that the target device has enough time to receive, process, and check the to-be-transmitted data forwarded by the cooperation device. In the longer cooperation mode, cooperation transmission can be implemented without changing the TTI used for the transmission between the cooperation device and the target device on the sidelink and without increasing processing complexity.

Figure 4:
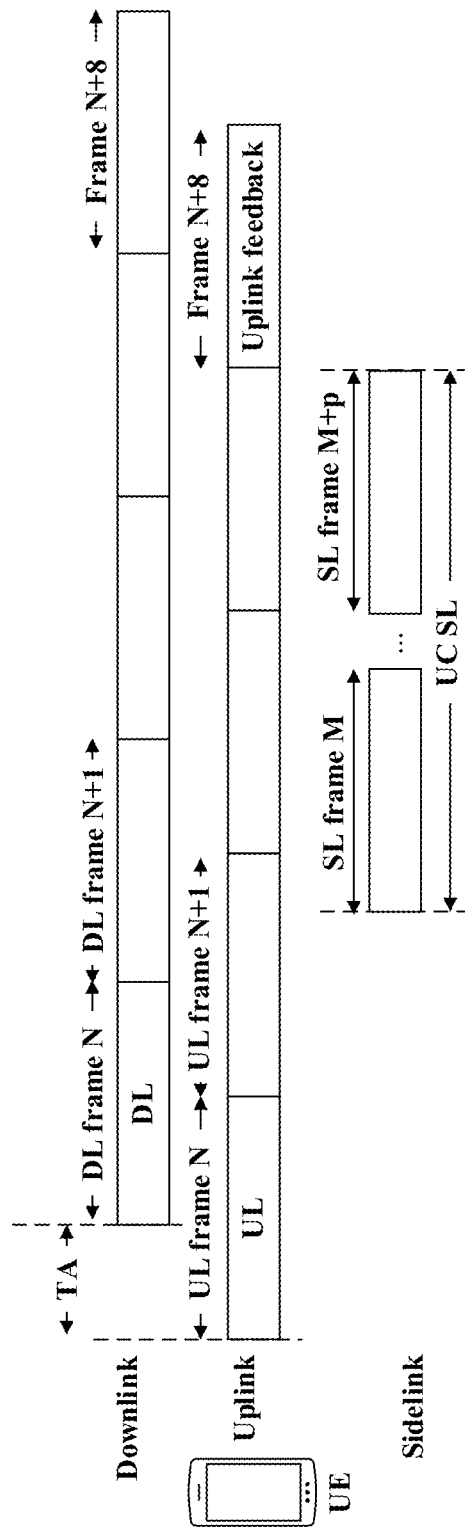
FIG. 4 is an example schematic diagram of a longer cooperation mode according to an embodiment of the present disclosure.

As shown in FIG. 4, it is assumed that the transmission time interval used on the sidelink is equal to the transmission time interval used for the transmission between the network side device and the cooperation group. The network side device sends to-be-transmitted data to the cooperation group in an $N^{th}$ subframe. After the target device receives, in the $N^{th}$ subframe, the to-be-transmitted data sent by the network side device, and processes the to-be-transmitted data sent by the network side device by using three subframes, four idle subframes are reserved, and an ACK/a NACK is fed back to the network side device in an $(N+8)^{th}$ subframe. The cooperation device receives the to-be-transmitted data in the $N^{th}$ subframe, the cooperation device requires three subframes to process the to-be-transmitted data, and the cooperation device forwards the to-be-transmitted data to the target device in an $(N+4)^{th}$ subframe. The target device also requires three subframes to process the to-be-transmitted data forwarded by the cooperation device, and the target device processes the to-be-transmitted data in an $(N+7)^{th}$ subframe, in other words, the target device may receive, process, and check, before the $(N+8)^{th}$ subframe, the to-be-transmitted data sent by the target device.

The implementation 1 and the implementation 2 may be used in combination.

In a same cooperation group, all cooperation devices and target devices may complete a cooperation process by using only one cooperation policy. The cooperation policy includes a cooperation mode type and parameters specifically used in the cooperation mode. The cooperation mode includes the faster cooperation mode, the longer cooperation mode, or a manner of combining the two modes. The parameters used in the cooperation mode include a parameter used for the sidelink and HARQ feedback duration of the target device for the to-be-transmitted data sent by the network side device. The parameter used for the sidelink includes at least one of a transmission time interval, a quantity of symbols included in each subframe, a subcarrier spacing corresponding to the symbol, a frequency band (channel) used for the sidelink, and a time-frequency resource used for the sidelink. The HARQ feedback duration of the target device for the to-be-transmitted data sent by the network side device is duration between a moment at which the target device receives the to-be-transmitted data sent by the network side device and a moment at which the target device feeds back, to the network side device, whether the to-be-transmitted data is correctly received.

In an embodiment, the network side device may send cooperation control signaling to the cooperation device and the target device, and the cooperation control signaling indicates the cooperation policy. Alternatively, the network side device may send cooperation control signaling to the target device, and the target device forwards the cooperation control signaling to the cooperation device. The cooperation control signaling delivered by the network side device may be carried in downlink control information of a physical downlink control channel (PDCCH), or carried in radio resource control (RRC) signaling, or carried in a system information block (SIB). Unified management may be implemented by using the network side device to indicate, thereby effectively avoiding interference between terminal devices.

It may be understood that when the cooperation control signaling indicates the cooperation policy, it may not be necessary to separately indicate the cooperation mode. A specific cooperation mode to be used may be directly represented by using a parameter specifically used in the cooperation mode.

In an embodiment, the cooperation control signaling may directly indicate the parameter specifically used in the cooperation mode.

In another embodiment, the cooperation control signaling may indicate a sequence number corresponding to the cooperation policy. The cooperation device and the target device may pre-store a table of the correspondence between the cooperation policy and the sequence number. After the cooperation device and the target device obtain the sequence number corresponding to the cooperation policy, the cooperation policy indicated by the cooperation control signaling may be obtained by searching the table, thereby reducing overheads of the cooperation control signaling.

The table of the correspondence may use a presentation form shown in Table 1. A value of HARQ feedback duration X of the target device is taken as X1, X2 to Xn respectively, and n represents a quantity of values of X. For example, n=5, X1=1, X2=2, X3=4, X4=8, and X5=16. HARQ feedback duration X of the target device indicates: If the target device receives, in an $N^{th}$ frame, to-be-transmitted data sent by the network side device, the target device feeds back an ACK/a NACK to the network side device in an $(N+X)^{th}$ frame. A value of a quantity of symbols included in each TTI 1 may be taken as 1, 2 to M respectively. Sequence numbers corresponding to different parameter combinations may be calculated directly based on a preset algebraic relational expression. In Table 1, a maximum of 350 different parameter combinations are supported, which are corresponding to 350 sequence numbers.

TABLE 1

| | | | Subcarrier spacing k [KHZ] | | | | |
|---|---|---|---|---|---|---|---|
| | | | 15 | 30 | 60 | 120 | 240 |
| HARQ feedback duration | X1 | Quantity of symbols corresponding to one TTI 1 | 1 Index = 1 | Index = M × n + 1 | . | . | Index = 4 × M × n + 1 |
| | | | 2 Index = 2 | Index = M × n + 2 | . | . | Index = 4 × M × n + 2 |
| | | | 3 Index = 3 | Index = M × n + 3 | . | . | Index = 4 × M × n + 3 |
| | | | . . | . | . | . | . |
| | | | M Index = M | Index = M × n + M | . | . | Index = 4 × M × |

TABLE 1-continued

| | | | Subcarrier spacing k [KHZ] | | | | |
|---|---|---|---|---|---|---|---|
| | | | 15 | 30 | 60 | 120 | 240 |
| ... ... | | | | | | | n + M |
| Xn | Quantity of symbols corresponding to one TTI 1 | 1 | Index = M × (n − 1) + 1 | Index = M × n + M × (n − 1) + 1 | . . | . . | Index = 4 × M × n + M × (n − 1) + 1 |
| | | 2 | Index = M × (n − 1) + 2 | Index = M × n + M × (n − 1) + 2 | . . | . . | Index = 4 × M × n + M × (n − 1) + 2 |
| | | 3 | Index = M × (n − 1) + 3 | Index = M × n + M × (n − 1) + 2 | . . | . . | Index = 4 × M × n + M × (n − 1) + 3 |
| | | . . | . | . | | | . |
| | | M | Index = M × n | Index = 2 × M × n | . | . | Index = 5 × M × n |

The table of the correspondence may use a presentation form shown in Table 2. That is, each sequence number corresponds to one parameter combination, and the parameter combination specifically includes a subcarrier spacing, HARQ feedback duration X, and a quantity of symbols included in each TTI 1. The sequence number may be indicated by using nine bits. For example, "000 000 000" indicates a sequence number equals to 1, and "000 000 010" indicates a sequence number equals to 3.

TABLE 2

| | | | | Subcarrier spacing k [KHz] | | | |
|---|---|---|---|---|---|---|---|
| | | | | 15 | 30 | 60 | 120 | 240 |
| HARQ feedback duration | 1 | Quantity of symbols corresponding to one TTI 1 | 1 | index = 1 | index = 71 | index = 141 | index = 211 | index = 281 |
| | | | 2 | index = 2 | index = 72 | index = 142 | index = 212 | index = 282 |
| | | | ... | | | | | |
| | | | 14 | index = 14 | index = 84 | index = 154 | index = 224 | index = 294 |
| | 2 | Quantity of symbols corresponding to one TTI 1 | 1 | index = 15 | index = 85 | index = 155 | index = 225 | index = 295 |
| | | | 2 | index = 16 | index = 86 | index = 156 | index = 226 | index = 296 |
| | | | ... | | | | | |
| | | | 14 | index = 28 | index = 98 | index = 168 | index = 238 | index = 308 |
| . . . . . . | | | | | | | | |
| | 16 | Quantity of symbols corresponding to one TTI 1 | 1 | index = 57 | index = 127 | index = 197 | index = 267 | index = 337 |
| | | | 2 | index = 58 | index = 128 | index = 198 | index = 268 | index = 338 |
| | | | ... | | | | | |
| | | | 14 | index = 70 | index = 140 | index = 210 | index = 280 | index = 350 |

The table of the correspondence may use a presentation form shown in Table 3. That is, each sequence number corresponds to one parameter combination, and the parameter combination specifically includes a subcarrier spacing, HARQ feedback duration X, and a quantity of symbols included in each TTI 1. A value of HARQ feedback duration X of the target device is taken as X1, X2 to Xn respectively, and n represents a quantity of values of X. For example, n=5, X1-1, X2-2, X3-4, X4-8, and X5=16. A value of a quantity of symbols included in each TTI 1 may be taken as 1, 2 to M respectively. In the presentation form shown in Table 3, it is easier for the cooperation device and the target device to find corresponding parameters based on the sequence numbers indicated by the cooperation control signaling.

TABLE 3

| Index | Parameter |
|---|---|
| 1 | Subcarrier spacing = 15 KHz; X = X1; and quantity of symbols corresponding to one TTI 1 = 1. |
| . . | . |
| M × n | Subcarrier spacing = 15 KHz; X = Xn; and quantity of |

TABLE 3-continued

| Index | Parameter |
|---|---|
| | symbols corresponding to one TTI 1 = M. |
| . . | . |
| 2 × M × n | Subcarrier spacing = 30 KHz; X = Xn; and quantity of |

TABLE 3-continued

| Index | Parameter |
|---|---|
| | symbols corresponding to one TTI 1 = M. |
| . . | . |
| 3 × M × n | Subcarrier spacing = 60 KHz; X = Xn; and quantity of symbols corresponding to one TTI 1 = M. |
| . . | . |
| 4 × M × n | Subcarrier spacing = 120 KHz; X = Xn; and quantity of symbols corresponding to one TTI 1 = M. |
| . . | . |
| 5 × M × n | subcarrier spacing = 240 KHz; X = Xn; and quantity of symbols corresponding to one TTI 1 = M. |

It may be understood that, meanings represented in Table 1, Table 2, and Table 3 are the same, and only different expression forms are used.

It may be understood that values of X and M in Table 1, Table 2, and Table 3 may be any non-negative integer. Table 1 merely provides an example, and is not enumerated one by one. The subcarrier spacing in Table 1 is respectively 15 KHz, 30 KHz, 60 KHz, 120 KHz, and 240 KHz. This is also merely an example. The present disclosure is still applicable to another subcarrier spacing such as 7.5 KHz or 480 KHz.

In another embodiment, the cooperation device determines the cooperation policy based on a rule agreed with the target device. Likewise, the target device also determines the cooperation policy based on the rule agreed with the cooperation device. The cooperation device and the target device separately determine the cooperation policy, so that a signaling indication of the network side device is reduced, control channel overheads are effectively reduced, and the like. A specific rule is set, so that the cooperation device and the target device can determine a same cooperation policy. In this embodiment, the cooperation device and the target device may not need an explicit indication from the network side device, but actively determine, based on a specific rule, a parameter combination that should be used to cooperate. For example, for the faster cooperation mode, the rule may be, for example: Time required for completing data transmission is calculated based on at least one parameter of a size of a data buffer, an MCS (modulation and coding scheme) configuration, bandwidth information, and the like, and then the TTI 1 that can be used to meet the time is determined. For example, with bandwidth support, a maximum TTI 1 that is determined based on the size of the data buffer and the MCS configuration and that the TTI 1 is less than the TTI 2. It may be understood that, it only needs to be ensured that the TTI 1 is less than the TTI 2. Excessively small TTI 1 increases hardware processing complexity and causes a waste of resources. The rule should be consistent for all cooperation devices and target devices, for example, it may be expressed in a standard. Similarly, for the longer cooperation mode and the combined mode, parameters used by the cooperation policy may also be determined based on at least one of the size of the data buffer, the MCS (modulation and coding scheme) configuration, the bandwidth information, and the like, it is only needs to be ensured that the determined parameters are unique.

S105. The target device feeds back, to the network side device at the first moment, whether the to-be-transmitted data is correctly received. In other words, the target device feeds back an ACK/a NACK to the network side device.

Before the first moment, the target device can receive, process, and check the to-be-transmitted data sent by the network side device, and can receive, process, and check the to-be-transmitted data forwarded by the cooperation device. Therefore, even if the target device cannot correctly receive the to-be-transmitted data sent by the network side device, if the target device can correctly receive the to-be-transmitted data forwarded by the cooperation device, the target device does not need to request the network side device to retransmit the to-be-transmitted data. In this embodiment of the present disclosure, the cooperation device assists the network side device to send data to the target device, which can effectively improve a success probability that the target device receives data, and reduce a probability that the network side device performs retransmission to the target device.

Further, in an embodiment, a frequency band used on the foregoing sidelink for data transmission may be a licensed frequency band. It should be understood that, a conventional licensed spectrum resource is a spectrum resource that can be used only when a national or a local radio committee has approved. Different systems (for example, an LTE system and a WiFi system) or systems of different operators cannot share a licensed spectrum resource. The licensed frequency band and a frequency band allocated by the network side device to the target device or the cooperation device have at least partial overlap.

In another embodiment, a frequency band used on the foregoing sidelink for data transmission may be an unlicensed frequency band. It should be understood that conventional unlicensed frequency band transmission means that no system allocation is required, and communications devices may share resources included in the unlicensed frequency band. Resource sharing on the unlicensed frequency band means that only limitations on indexes such as transmit power and out-of-band leakage are specified for use of a specific frequency spectrum, to ensure that a basic coexistence requirement is met between a plurality of devices that jointly use the frequency band. An operator may implement network capacity offloading by using the unlicensed frequency band resource, but needs to obey regulations and requirements formulated by different regions and different spectrums for the unlicensed frequency band resource. These requirements are usually posed to protect a public system such as radar and to ensure that a plurality of systems fairly coexist and cause as little negative impact to each other as possible. These requirements include a transmit power limit, an out-of-band emission indicator, indoor and outdoor use restrictions. In addition, some regions have some additional coexistence policies and the like. The unlicensed frequency band has low use costs, does not cause interference to communication between the network side device and the target device or the cooperation device, and does not occupy a valuable licensed frequency band resource.

In the following embodiments, for example, the unlicensed frequency band is used. Each terminal device may use the unlicensed frequency band in a contention manner or a sensing manner. For example, the terminal device uses the unlicensed spectrum resource in a listen before talk (LBT) manner. In other words, before the terminal device sends data, at least one channel on the unlicensed frequency band is first sensed. For example, the sensing manner may be Cat-4, Cat-2, or the like. The channel can be occupied to send the to-be-transmitted data to the target device only when a sensing result is idle. Otherwise, the channel cannot be used.

In an embodiment, a channel used for transmission on the sidelink includes one or more candidate sidelink channels. These candidate sidelink channels may be pre-specified. The cooperation device may select, based on an indication of the network side device, or an indication of the target device, or a preset rule, or randomly select a channel from one or more candidate sidelink channels to sense.

In an embodiment, step S104 specifically includes: The target device separately senses on each candidate sidelink channel, the to-be-transmitted data sent by the cooperation device. Therefore, the target device may receive, as much as possible, the to-be-transmitted data sent by the cooperation device, which may further improve a probability that the target device correctly receives the to-be-transmitted data.

Figure 5:
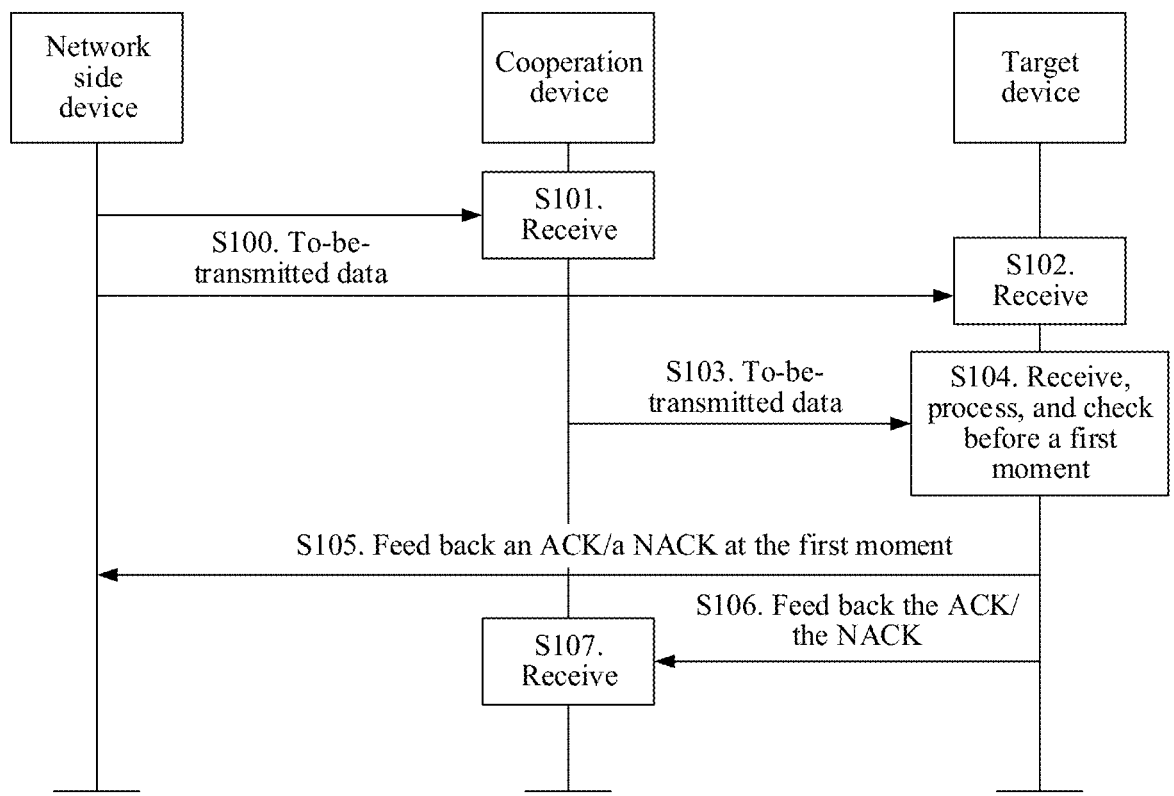
FIG. 5 is another example flowchart of a data transmission method according to an embodiment of the present disclosure.
Figure 6A:
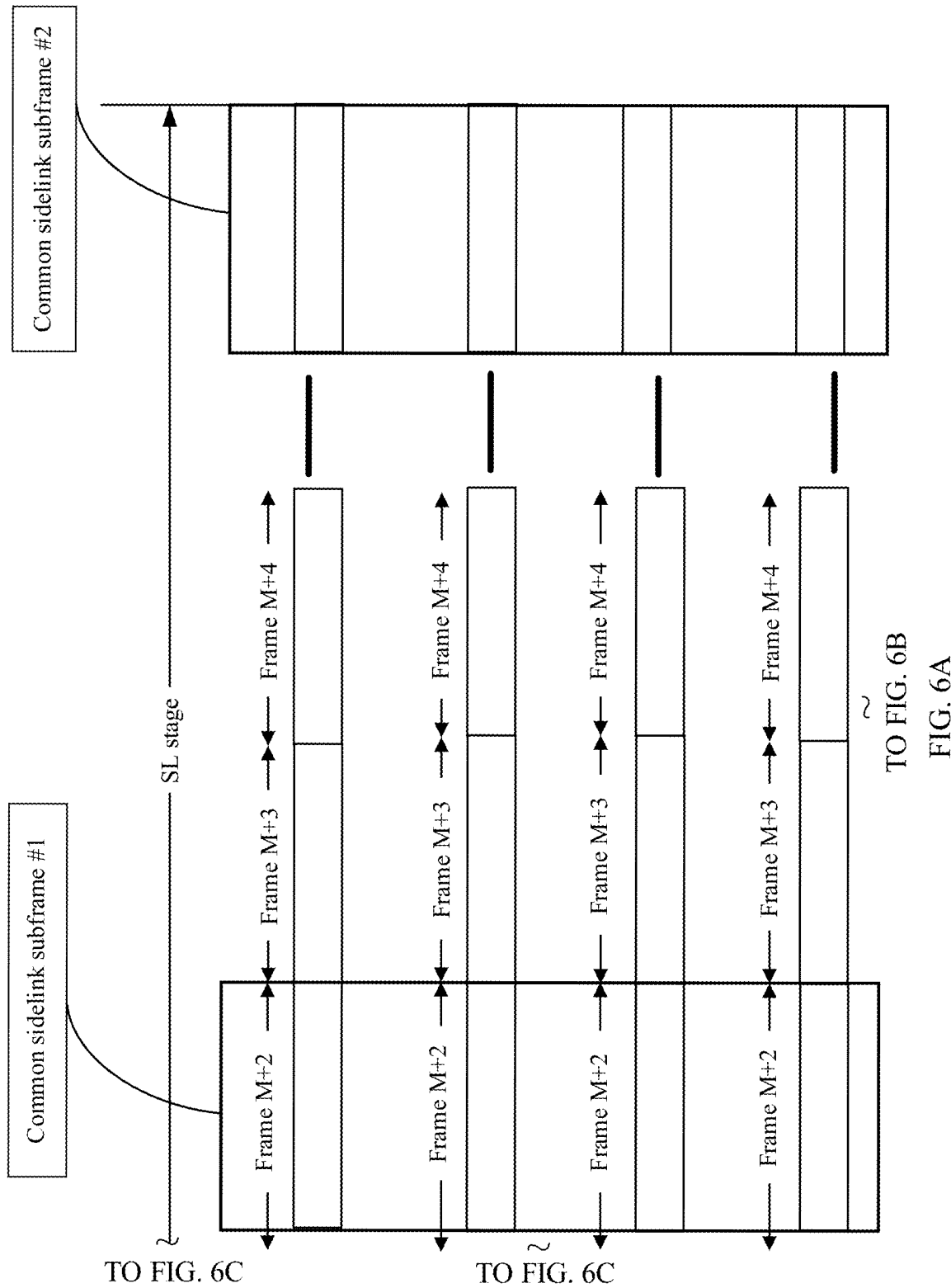
FIG. 6A, FIG. 6B, FIG. 6C, and FIG. 6D are example schematic diagrams of user cooperation according to an embodiment of the present disclosure.
Figure 6B:
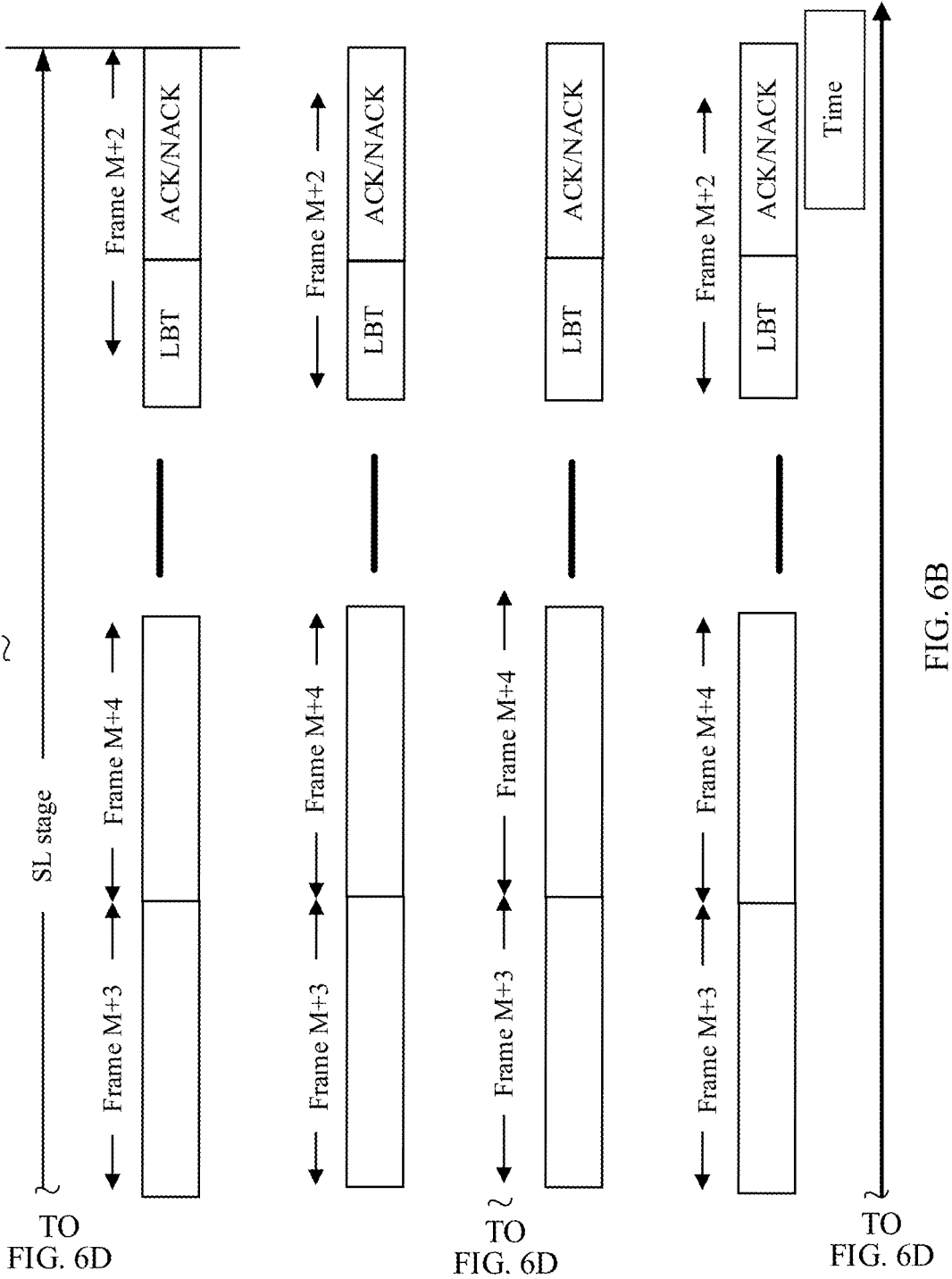
Figure 6C:
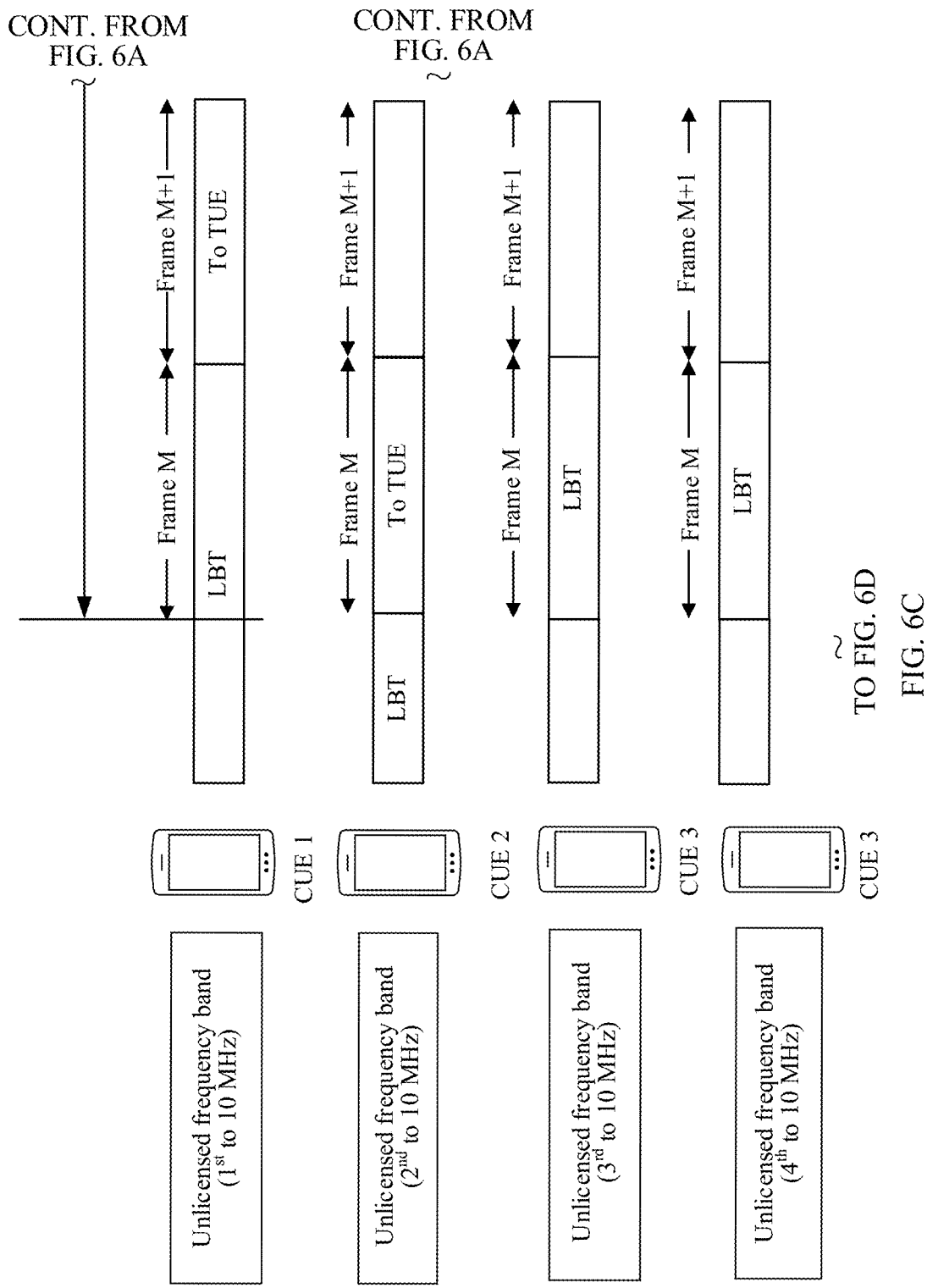
Figure 6D:
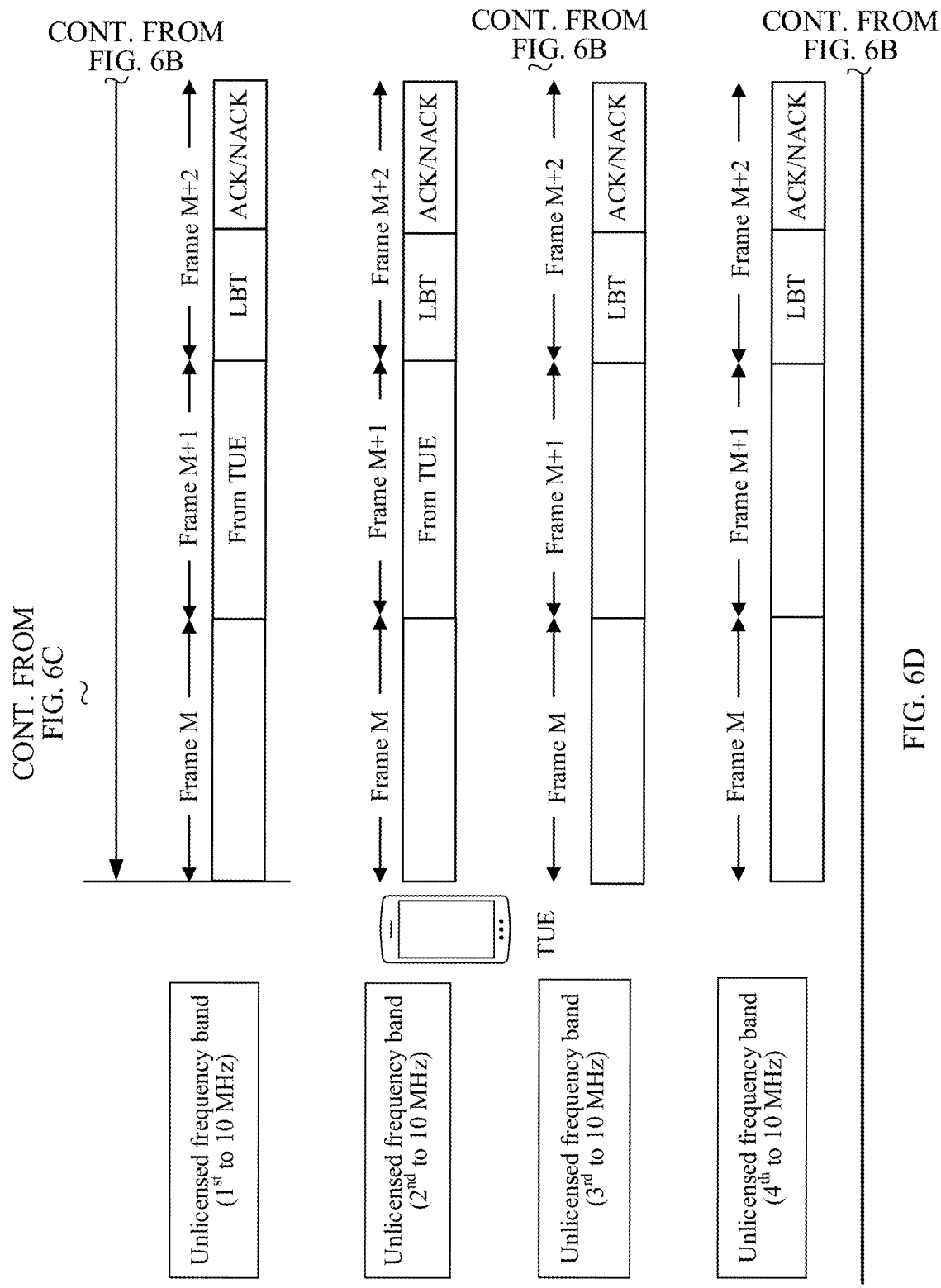
Figure 7A:
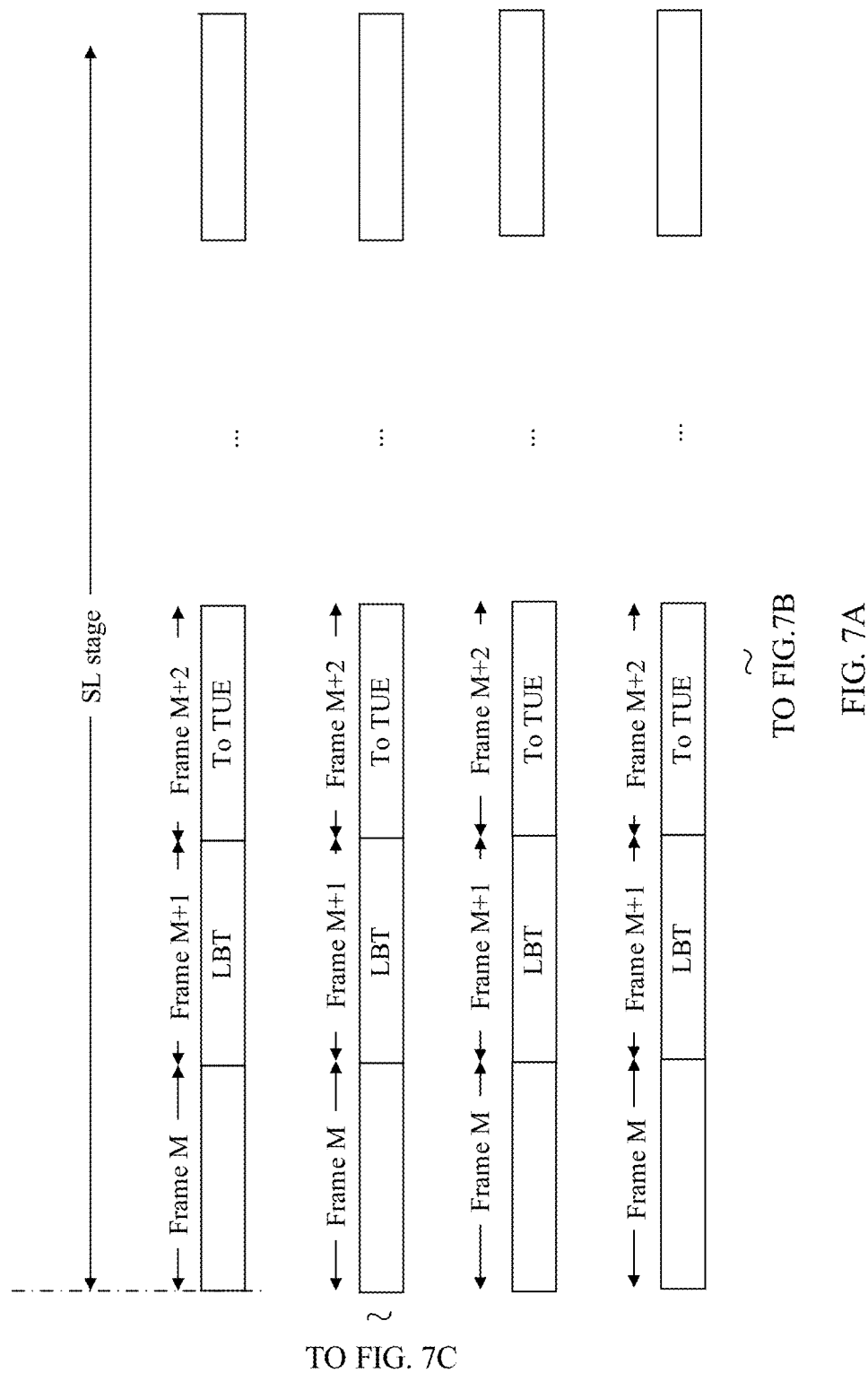
Figure 7B:
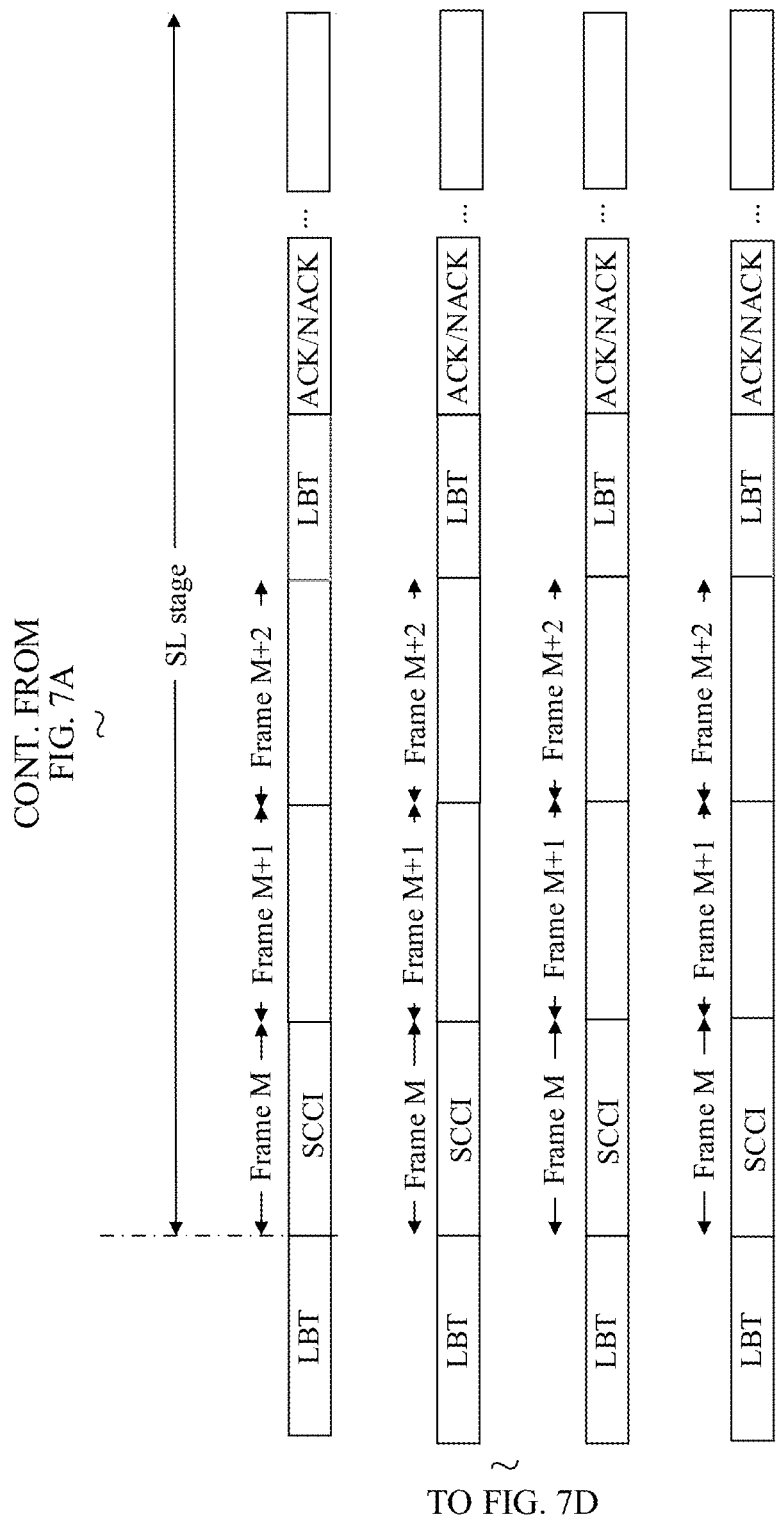

Different sidelink channels may have different availability. For example, sensing duration of cooperation device CUE 1 may be a length of two sidelink subframes, sensing duration of cooperation device CUE 2 may be a length of one sidelink subframe, and sensing duration of cooperation devices CUE 3 and CUE 4 may be a length of three sidelink subframes. Therefore, each cooperation device cannot send the to-be-transmitted data to the target device in a same sidelink subframe. If the target device can correctly receive the to-be-transmitted data that is first sent by each cooperation device, or the target device can correctly receive the to-be-transmitted data sent by the network side device, the target device does not need to continue to wait for receiving the to-be-transmitted data that is not sent by each cooperation device. Cooperation devices that do not have data to send to a target device will not perform data transmission, to reduce a spectrum resource and energy consumption. To resolve this problem, in an embodiment, the target device may send, to the cooperation device, information (ACK/NACK) used to indicate whether the to-be-transmitted data is correctly received. Therefore, when receiving an ACK fed back by the target device, the cooperation device does not need to send the to-be-transmitted data to the target device, thereby effectively reducing the spectrum resource. Further, as shown in FIG. 5, the method further includes the following steps.

S106. The target device sends, in a common sidelink subframe (Common SL Subframe), information used to indicate whether the to-be-transmitted data is correctly received. The common sidelink subframe is a subframe at a preset location that is on the sidelink channel and that is agreed on between the target device and the cooperation device.

The subframe at the preset location may be understood as a subframe corresponding to a preset subframe number. For example, an $(M+2)^{th}$ frame, an $(M+8)^{th}$ frame, or an $(M+14)^{th}$ frame.

In an embodiment, before sending an ACK/a NACK in the common sidelink subframe, the target device may first sense on each sidelink channel, and then send an ACK/a NACK on common sidelink subframes on all available channels.

In an embodiment, locations of common sidelink subframes on the sidelink channels may be the same. In other words, the target device may separately send an ACK/a NACK on the all available sidelink channels at a same moment (namely, a moment corresponding to the common sidelink subframe). As shown in FIG. 6A, FIG. 6B, FIG. 6C, and FIG. 6D, a location of one common sidelink subframe is M+2, and the target device sends an ACK/a NACK in an $(M+2)^{th}$ sidelink subframe on all sidelink channels. In another embodiment, locations of common sidelink subframes on the sidelink channels may be different.

In another embodiment, the common sidelink subframe may also be set on some sidelink channels. The target device and the cooperation device negotiate to set a channel on which the common sidelink subframe is located and a location of the common sidelink subframe, so that the cooperation device receives an ACK/a NACK in the common sidelink subframe on corresponding channel.

A common sidelink subframe on each sidelink channel forms a common ACK pool. Indication information of the common ACK pool may be configured by the network side device, may be determined through negotiation between the target device and the cooperation device, or may be predetermined in a standard.

S107. The cooperation device receives, in the common sidelink subframe, information used to indicate whether the target device correctly receives the to-be-transmitted data.

When a sidelink subframe ends before the common sidelink subframe, if the cooperation device does not complete a sensing process, or just completes the sensing process but has not yet sent the to-be-transmitted data to the target device, the cooperation device stops a current action, stays in a receiving state when the common sidelink subframe arrives, and receives an ACK/a NACK fed back by the target device.

If the cooperation device receives, before completing sending the to-be-transmitted data to the target device, information used to indicate that the target device correctly receives the to-be-transmitted data, the cooperation device abandons sending the to-be-transmitted data to the target device.

In this embodiment, if the cooperation device does not complete the sensing process or just completes the sensing process but has not yet sent the to-be-transmitted data to the target device, it is considered that the cooperation device has not send the to-be-transmitted data to the target device.

If the cooperation device receives, in the common sidelink subframe, ACK information fed back by the target device, it indicates that the target device correctly receives the to-be-transmitted data. After the common sidelink subframe, the cooperation device may abandon sending the to-be-transmitted data to the target device. It may be understood that, the cooperation device stops a sensing process that has not been completed, which may also be considered that the cooperation device abandons sending the to-be-transmitted data to the target device.

In another embodiment, if the cooperation device receives, in the common sidelink subframe, NACK information fed back by the target device, it indicates that the target device does not correctly receive the to-be-transmitted data. After the common sidelink subframe, the cooperation device continues the sensing process that has not been completed. Alternatively, the cooperation device continues sending the to-be-transmitted data to the target device.

In another embodiment, if the cooperation device receives, in the common sidelink subframe after sending the to-be-transmitted data to the target device, NACK information fed back by the target device, it indicates that the target device does not correctly receive the to-be-transmitted data, and the cooperation device may resend the to-be-transmitted data to the target device, to further improve a probability that the target device correctly receives the to-be-transmitted data.

Further, in an embodiment, the cooperation device senses the sidelink channel, and when senses an available sidelink channel, determines whether duration between a current moment and a moment corresponding to a next common sidelink subframe is greater than or equal to duration required for sending the to-be-transmitted data. When the duration between the current moment and the moment corresponding to the next common sidelink subframe is greater than or equal to the duration required for sending the to-be-transmitted data, perform step S103. When the duration between the current moment and the moment corresponding to the next common sidelink subframe is less than the duration required for sending the to-be-transmitted data, before the next common sidelink subframe, the cooperation device abandons sending the to-be-transmitted data to the target device, and after the next common sidelink subframe, performs step S103. In this embodiment, if the cooperation device completes the sensing process in one or more sidelink subframes before the next common sidelink subframe, but if a quantity of remaining sidelink subframes before the next common sidelink subframe is fewer than a quantity of subframes required for sending the to-be-transmitted data, the cooperation device abandons sending the to-be-transmitted data to the target device, and sends the to-be-transmitted data to the target device after the next common sidelink subframe.

In an embodiment, the cooperation device may start a sensing process before receiving the to-be-transmitted data sent by the network side device, or start the sensing process immediately after receiving the to-be-transmitted data, to send the to-be-transmitted data to the target device as soon as possible. As shown in FIG. 6A, FIG. 6B, FIG. 6C, and FIG. 6D, CUE 1 completes sensing in an $M^{th}$ sidelink subframe, and CUE 2 completes sensing before the $M^{th}$ sidelink subframe. It may be determined, by calculation, that the to-be-transmitted data may be sent by using one sidelink subframe. Therefore, CUE 1 and CUE 2 send the to-be-transmitted data to the target device in an $(M+1)^{th}$ sidelink subframe, and receive a feedback of TUE in an $(M+2)^{th}$ sidelink subframe (namely, the common sidelink subframe). Because an LBT process is still not completed in the $(M+1)^{th}$ sidelink subframe, the CUE 3 and the CUE 4 stop a current process, and receive the feedback of TUE in the $(M+2)^{th}$ sidelink subframe (namely, the common sidelink subframe). If the feedback is a NACK, the sensing process continues in an $(M+3)^{th}$ sidelink subframe.

Further, the cooperation device may select a channel based on an instruction of the target device instead of based on an instruction of the network side device.

Specifically, in an embodiment, the target device may start the sensing process before receiving the to-be-transmitted data sent by the network side device, or start the sensing process immediately after receiving the to-be-transmitted data, and send sidelink common control information (SCCI) on all available sidelink channels after sensing is completed.

SCCI includes scheduling information of the cooperation device, in other words, parameter information such as resource indication information and MCS that are specific to each cooperation device on the sidelink, and resource indication information that the target device feeds back an ACK/a NACK on the sidelink, and the like. SCCI may further include 1-bit cooperation indication information, and the cooperation indication information is used to notify the cooperation device whether cooperation transmission needs to be performed.

The cooperation device receives SCCI, and sends, based on an instruction of SCCI, the to-be-transmitted data to the target device on a resource specified by the target device for the cooperation device and based on parameters such as a specified MCS. Before sending the to-be-transmitted data, the cooperation device may perform sensing, and sends the to-be-transmitted data after the sensing is completed.

The target device receives, at the resource location specified by SCCI, the to-be-transmitted data sent by the cooperation device, and sends, at the resource location specified by SCCI, an ACK/a NACK to the cooperation device. The target device may perform sensing before sending an ACK/a NACK, and sends an ACK/a NACK after the sensing is completed. Alternatively, the target device may directly send an ACK/a NACK without sensing.

The cooperation device receives, at the resource location specified by the SCCI, an ACK/a NACK sent by the target device.

As shown in FIG. 7A, FIG. 7B, FIG. 7C, and FIG. 7D, if the target device completes sensing before an $M^{th}$ sidelink subframe, the target device may send SCCI to all cooperation devices in the $M^{th}$ subframe of each available sidelink channel. After receiving SCCI, the cooperation devices CUE 1, CUE 2, CUE 3, and CUE 4 separately start to sense, based on an instruction of SCCI, on corresponding sidelink channels, and send, after the sensing succeeds, the to-be-transmitted data to the target device on the resource location specified by SCCI. After receiving the to-be-transmitted data, the target device feeds back an ACK/a NACK. CUE 1, CUE 2, CUE 3, and CUE 4 receive an ACK/a NACK feedback of the target device at the specified location based on the instruction of SCCI.

It may be understood that, in the foregoing embodiments, a cooperation device of one cooperation group may also be a cooperation device of another cooperation group, in other words, one cooperation device may perform cooperation transmission for a plurality of cooperation groups at the same time.

Figure 8:
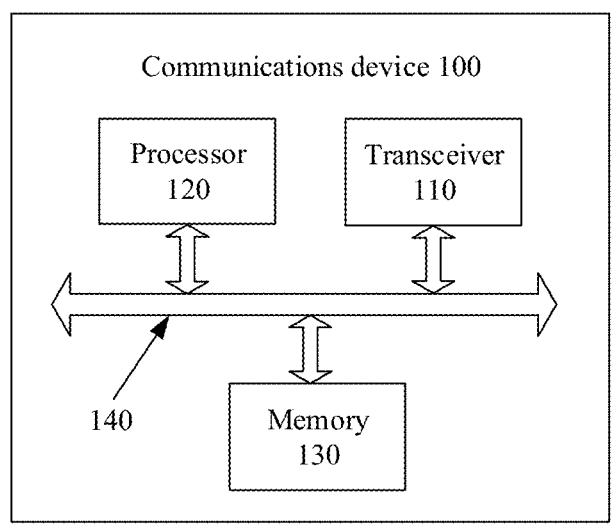
FIG. 8 is an example schematic structural diagram of hardware of a communications device according to an embodiment of the present disclosure.

The present disclosure further provides a communications device 100. The communications device 100 may be the cooperation device described in the foregoing embodiments. As shown in FIG. 8, the communications device 100 includes a transceiver 110 and a processor 120. The transceiver 110 is connected to the processor 120. Optionally, the communications device 100 further includes a memory 130. The memory 130 is separately connected to the processor 120 and the transceiver 110. Further, optionally, the communications device 100 further includes a bus system 140. The processor 120, the transceiver 110, and the memory 130 may be connected by using the bus system 140. The memory 140 may be configured to store an instruction, and the processor 120 is configured to execute the instruction stored in the memory 140, to control the transceiver 110 to receive and send a signal. The memory 140 may be further configured to cache data generated when the processor 120 executes the instruction.

The transceiver 110 is configured to receive to-be-transmitted data sent by a network side device to a cooperation group, where the cooperation group includes the communications device 100 and a target device.

The processor 120 is configured to control the transceiver 110 to send the to-be-transmitted data to the target device before a first moment. A moment at which the target device feeds back, to the network side device, whether the to-be-transmitted data is correctly received is defined as the first moment. A moment at which the transceiver 110 sends the to-be-transmitted data to the target device is defined as a second moment. Duration between the second moment and the first moment is or should be greater than or equal to duration required by the target device to receive, process, and check the to-be-transmitted data sent by the transceiver 110.

It can be learned from the foregoing embodiment that the communications device 100 shown in FIG. 8 performs steps S101, S103, and S107 in the embodiment shown in FIG. 5. For more details when the transceiver 110 and the processor 120 perform the foregoing steps, refer to related descriptions in the embodiments shown in FIG. 2 and FIG. 5. Details are not described herein again.

In this embodiment of the present disclosure, even if the target device cannot correctly receive the to-be-transmitted data sent by the network side device, if the target device can correctly receive the to-be-transmitted data forwarded by the communications device 100, the target device does not need to request the network side device to retransmit the to-be-transmitted data, which can effectively improve a success probability that the target device receives data, and reduce a probability that the network side device performs retransmission to the target device.

For other functions of the processor 120 and the transceiver 110, refer to descriptions of corresponding embodiments in the foregoing data transmission method. Details are not described herein again.

Figure 9:
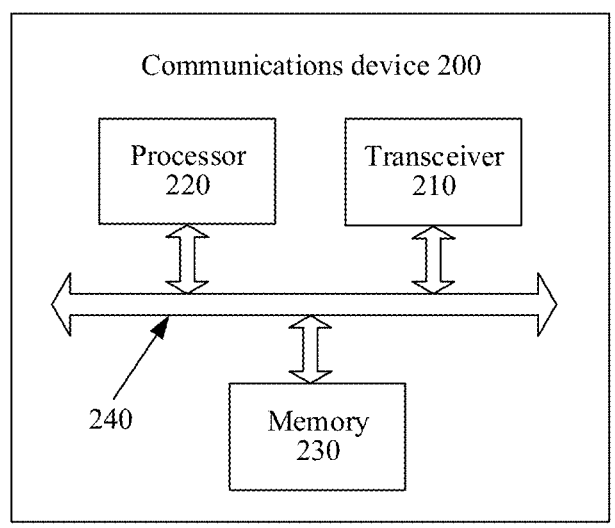
FIG. 9 is an example schematic structural diagram of hardware of a communications device according to another embodiment of the present disclosure.

The present disclosure further provides a communications device 200. The communications device 200 may be the target device described in the foregoing embodiments. As shown in FIG. 9, the communications device 200 includes a transceiver 210 and a processor 220. The transceiver 210 is connected to the processor 220. Optionally, the communications device 200 further includes a memory 230. The memory 230 is separately connected to the processor 220 and the transceiver 210. Further, optionally, the communications device 200 further includes a bus system 240. The processor 220, the transceiver 210, and the memory 230 may be connected by using the bus system 240. The memory 240 may be configured to store an instruction, and the processor 220 is configured to execute the instruction stored in the memory 240, to control the transceiver 210 to receive and send a signal. The memory 240 may be further configured to cache data generated when the processor 220 executes the instruction.

The transceiver 210 is configured to receive to-be-transmitted data sent by a network side device to a cooperation group, where the cooperation group includes a cooperation device and the communications device 200.

The transceiver 210 is further configured to receive the to-be-transmitted data sent by the cooperation device.

The processor 220 is configured to process and check, before a first moment, the to-be-transmitted data sent by the cooperation device. A moment at which the communications device 200 feeds back, to the network side device, whether the to-be-transmitted data is correctly received is defined as the first moment.

It can be learned from the foregoing embodiment that the communications device 200 shown in FIG. 9 performs steps S102, S104, S105 and S106 in the embodiment shown in FIG. 5. For more details when the transceiver 210 and the processor 220 perform the foregoing steps, refer to related descriptions in the embodiments shown in FIG. 2 and FIG. 5. Details are not described herein again.

In this embodiment of the present disclosure, even if the communications device 200 cannot correctly receive the to-be-transmitted data sent by the network side device, if the communications device 200 can correctly receive the to-be-transmitted data forwarded by the cooperation device, the communications device 200 does not need to request the network side device to retransmit the to-be-transmitted data, which can effectively improve a success probability that the communications device 200 receives data, and reduce a probability that the network side device performs retransmission to the communications device 200.

For other functions of the processor 220 and the transceiver 210, refer to descriptions of corresponding embodiments in the foregoing data transmission method. Details are not described herein again.

The present disclosure further provides a data transmission system. The data transmission system includes the communications device 100 and the communications device 200 described in the foregoing embodiments. For details, refer to the foregoing embodiments. Details are not described herein again.

A person of ordinary skill in the art may understand that all or some of the steps of the foregoing methods may be implemented by a program instructing relevant hardware. The program may be stored in a computer-readable storage medium. The storage medium may be non-transitory and includes: a ROM, a RAM, and an optical disc.

To sum up, the foregoing descriptions are merely embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A data transmission method, wherein the method comprises:
   receiving, by a cooperation device, to-be-transmitted data sent by a network side device to a cooperation group, wherein the cooperation group comprises the cooperation device and a target device; and
   sending, by the cooperation device, the to-be-transmitted data to the target device before a first moment using a sidelink between the cooperation device and the target device, wherein
   a moment at which the target device feeds back, to the network side device, whether the to-be-transmitted data is correctly received is defined as the first moment, a moment at which the cooperation device sends the to-be-transmitted data to the target device is determined as a second moment, and duration between the second moment and the first moment is set to be greater than or equal to duration required by the target device to receive, process, and check the to-be-transmitted data sent by the cooperation device; and
   receiving, by the cooperation device in a common sidelink subframe, information used to indicate whether the target device correctly receives the to-be-transmitted data, wherein the common sidelink subframe is a subframe at a preset location that is on a channel for transmission on the sidelink and that is agreed on between the target device and the cooperation device.

2. The method according to claim 1, wherein a transmission time interval (TTI) used for transmission between the cooperation device and the target device is less than a TTI used for transmission between the target device and the network side device.

3. The method according to claim 1, wherein a frequency band used for transmission on the sidelink is a licensed frequency band or an unlicensed frequency band.

4. The method according to claim 3, wherein when the unlicensed frequency band is used for transmission on the sidelink, the channel used for transmission on the sidelink comprises one or more candidate sidelink channels.

5. The method according to claim 4, wherein the method further comprises:
   if the cooperation device receives, before completing sending of the to-be-transmitted data to the target device, information used to indicate that the target device correctly receives the to-be-transmitted data, abandoning, by the cooperation device, sending the to-be-transmitted data to the target device.

6. A data transmission method, wherein the method comprises:
   receiving, by a target device, to-be-transmitted data sent by a network side device to a cooperation group, wherein the cooperation group comprises a cooperation device and the target device; and
   receiving, processing, and checking, by the target device before a first moment, the to-be-transmitted data sent by the cooperation device, wherein
   a moment at which the target device feeds back, to the network side device, whether the to-be-transmitted data is correctly received is defined as the first moment
   wherein the target device has at least one subframe that is between the third moment and the first moment and that is not used to process the to-be-transmitted data sent by the network side device.

7. The method according to claim 6, wherein a transmission time interval (TTI) used for transmission between the cooperation device and the target device is less than a TTI used for transmission between the target device and the network side device.

8. The method according to claim 6, wherein a moment at which the target device receives the to-be-transmitted data sent by the network side device is defined as a third moment.

9. The method according to claim 6, wherein the target device receives, by using a sidelink between the target device and the cooperation device, the to-be-transmitted data sent by the cooperation device.

10. The method according to claim 9, wherein a frequency band used for transmission on the sidelink is a licensed frequency band or an unlicensed frequency band.

11. The method according to claim 10, wherein when the unlicensed frequency band is used for transmission on the sidelink, a channel used for transmission on the sidelink comprises one or more candidate sidelink channels, and the method further comprises:
sending, by the target device in a common sidelink subframe, information used to indicate whether the to-be-transmitted data is correctly received, wherein the common sidelink subframe is a subframe at a preset location that is on the sidelink channel and that is agreed on between the target device and the cooperation device.

12. A communications device, wherein the communications device comprises a processor and a transceiver;
the transceiver is configured to receive to-be-transmitted data sent by a network side device to a cooperation group, wherein the cooperation group comprises the communications device and a target device; and
the processor is configured to control the transceiver to send the to-be-transmitted data to the target device before a first moment by using a sidelink between the transceiver and the target device, wherein
a moment at which the target device feeds back, to the network side device, whether the to-be-transmitted data is correctly received is defined as the first moment, a moment at which the transceiver sends the to-be-transmitted data to the target device is determined as a second moment, and duration between the second moment and the first moment is set to be greater than or equal to duration required by the target device to receive, process, and check the to-be-transmitted data sent by the transceiver; and
the transceiver is further configured to receive, in a common sidelink subframe, information used to indicate whether the target device correctly receives the to-be-transmitted data, wherein the common sidelink subframe is a subframe at a preset location that is on a channel used for transmission on the sidelink and that is agreed on between the target device and the communications device.

13. The communications device according to claim 12, wherein a transmission time interval (TTI) used for transmission between the communications device and the target device is less than a TTI used for transmission between the target device and the network side device.

14. The communications device according to claim 12, wherein a frequency band used for transmission on the sidelink is a licensed frequency band or an unlicensed frequency band.

15. The communications device according to claim 14, wherein when the unlicensed frequency band is used for transmission on the sidelink, the channel used for transmission on the sidelink comprises one or more candidate sidelink channels.

16. The communications device according to claim 15, wherein the transceiver is further configured to receive information used to indicate that the target device correctly receives the to-be-transmitted data, and if the transceiver receives, before completing sending of the to-be-transmitted data to the target device, the information used to indicate that the target device correctly receives the to-be-transmitted data, the processor is further configured to control the transceiver to abandon sending the to-be-transmitted data to the target device.

17. A communications device, wherein the communications device comprises a processor and a transceiver;
the transceiver is configured to receive to-be-transmitted data sent by a network side device to a cooperation group, wherein the cooperation group comprises a cooperation device and the communications device;
the transceiver is further configured to receive the to-be-transmitted data sent by the cooperation device; and
the processor is configured to process and check, before a first moment, the to-be-transmitted data sent by the cooperation device, wherein
a moment at which the communications device feeds back, to the network side device, whether the to-be-transmitted data is correctly received is defined as the first moment;
wherein the target device has at least one subframe that is between the third moment and the first moment and that is not used to process the to-be-transmitted data sent by the network side device.

18. The communications device according to claim 17, wherein a transmission time interval (TTI) used for transmission between the cooperation device and the communications device is less than a TTI used for transmission between the communications device and the network side device.

* * * * *